UNITED STATES PATENT OFFICE.

GEORGE A. KERR, OF LYNCHBURG, VIRGINIA.

DECOLORIZING AGENT.

1,163,827.

Specification of Letters Patent. Patented Dec. 14, 1915.

No Drawing. Application filed April 6, 1914. Serial No. 830,045.

*To all whom it may concern:*

Be it known that I, GEORGE A. KERR, of Lynchburg, in the county of Campbell and State of Virginia, have invented certain new and useful Improvements in Decolorizing Agents; and I do hereby declare the following to be a full, clear, and exact description of the invention, such as will enable others skilled in the art to which it appertains to make and use the same.

The object of this invention is to produce a simple but highly efficient decolorizing agent for tanning extracts.

I have discovered that leguminous vegetable substances, such as peas, beans and other leguminous vegetables or by-products thereof, form perfect decolorizing and clarifying agencies for tanning extracts.

The means of utilizing my invention may be widely varied, and is controlled, in a large measure, by the means or method employed for extracting the tanning matter from the raw material. When closed extractors or autoclaves are employed the leguminous vegetable substance may be added to the fresh raw material, the absorption and precipitation of the coloring matter by the vegetable substance taking place while the liquor is in circulation through the series of autoclaves. In the open extraction system the decolorizing agent may be similarly introduced, but not with the same degree of efficiency. To obtain the best results the tanning extract should be separately treated. To this end the ground leguminous vegetable substance is first digested in water at from 60° to 80° C. until thoroughly saturated. When heated to the temperature of the tanning extract it should be added thereto while the latter is being agitated. The temperature must be be maintained and the agitation continued until the decolorizing material has thoroughly combined with the coloring matter. The heat and agitation being discontinued, after the flocculent precipitate is allowed to settle, the supernatant liquor is drawn off and reduced to commercial extract. Subsequently the settlings may be stirred up with the water or some of the liquor and separation completed with the aid of a filter press.

As another illustration of the fact that my invention may be utilized in various ways, it may be added that the leguminous vegetable substance may be boiled until it becomes a homogeneous paste, more or less fluid, in which condition it may be added to the liquor or introduced into the extractors.

I claim as my invention:

1. A decolorizing agent for tanning extracts consisting of legumin.

2. A decolorizing agent for tanning extracts consisting of vegetable substances containing legumin.

3. A decolorizing agent for tanning extracts consisting of a homogeneous paste of vegetable substances containing legumin.

In testimony whereof, I have signed this specification in the presence of two subscribing witnesses.

GEORGE A. KERR.

Witnesses:
 H. T. THORNHILL,
 W. F. AMONETTE.